Jan. 19, 1965

A. TAUPIN 3,166,134

PIEZOMETRIC WEIGHING DEVICES

Filed April 8, 1963

INVENTOR
ANDRÉ TAUPIN
BY
Bacon & Thomas
ATTORNEYS

United States Patent Office 3,166,134
Patented Jan. 19, 1965

3,166,134
PIEZOMETRIC WEIGHING DEVICES
André Taupin, Le Vivier, Urzy, France
Filed Apr. 8, 1963, Ser. No. 271,339
Claims priority, application France, Apr. 6, 1962,
893,544, Patent 1,327,255
3 Claims. (Cl. 177—209)

The present invention relates to a piezometric weighing device in which the force exerted by a weight to be measured is transmitted to a piezometer through a fluid.

Various piezometric weighing devices of this type are known, comprising a plate supporting a weight to be measured, at least one enclosure located between the plate and a support structure, the said enclosure being filled with a fluid, and a device for measuring the pressure of the fluid it contains being connected to the enclosure.

These various known devices generally have a number of disadvantages, due particularly to the inaccuracy of the measurement resulting from variations in the position of the centre of gravity of the loaded plate with respect to the surfaces of the plate bearing on the enclosure.

The present invention enables this disadvantage to be remedied or minimized and provides a piezometric device for weighing heavy loads, which may exceed 20 tons, with remarkable accuracy, without being influenced by variations in room temperature nor by variations, within wide limits, of the position of the centre of gravity of the loaded plate. The invention accordingly provides a piezometric weighing device, comprising a plate for supporting a load to be measured, at least one enclosure located between the plate and a support structure, the said enclosure being filled exclusively by a volume of incompressible fluid which is smaller than the maximum capacity of the enclosure and bounded by walls made of a fluid-tight, pliable and extensible material, and a device connected to the enclosure for measuring the pressure of the fluid it contains, and wherein said enclosure rests freely on the support structure exclusively at the lower part and the plate rests on the wall of the enclosure at at least two bearing surfaces, the parts of the plate and of the enclosure adjacent to those portions which are in contact being of such configuration as to have curves of different values when examined in a section made at right angles, whereby the measurement is substantially accurate, even if the load is off centre.

There may be at least two enclosures if desired, and these enclosures may communicate with one another by at least one tube made of a fluid-tight and inextensible material.

The enclosures may be constituted by at least two cylindrical tubes hermetically sealed at their ends.

Figure 1:
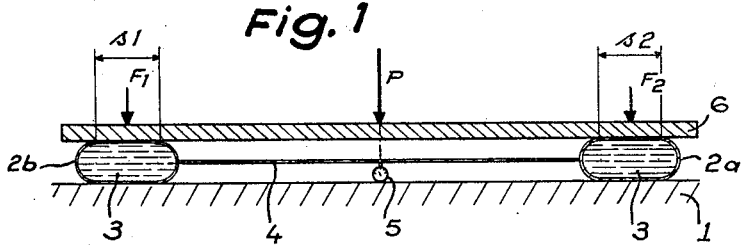
Figure 2:
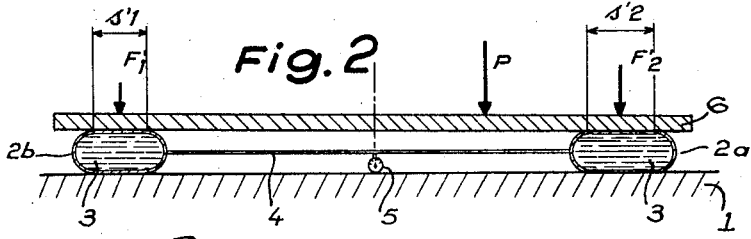
Figure 3:
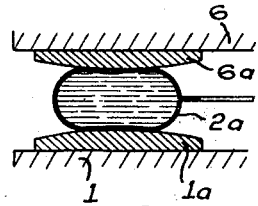
Figure 4:
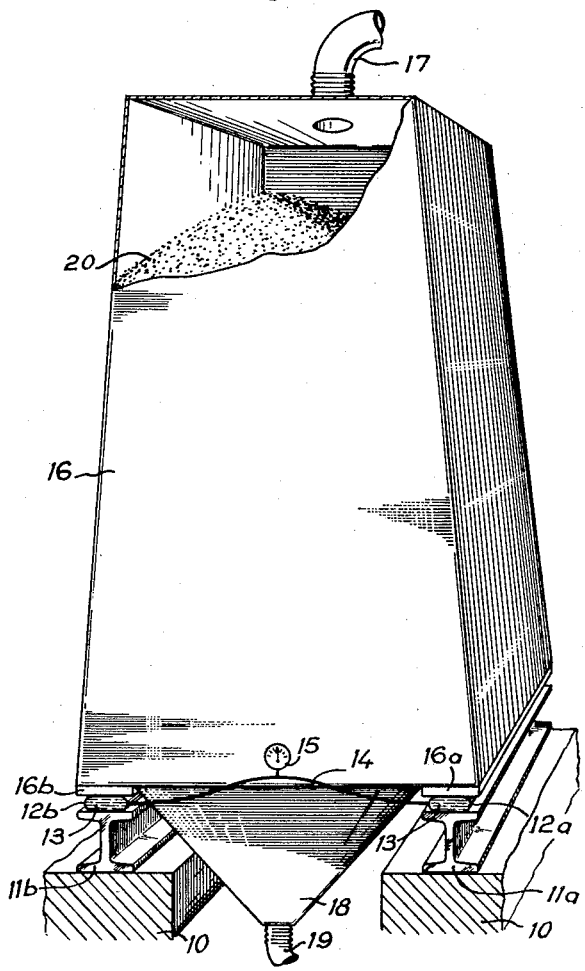

In order that the invention may be more clearly understood, reference will now be made to the accompanying drawings which show one embodiment thereof by way of example only, and in which:

FIGURE 1 is a schematic section through the weighing device, in which a load P is in the transverse median plane, FIGURE 2 is a schematic section through the same device shown in FIG. 1, in which a load P is off center, FIGURE 3 is a sectional view showing a particular form of the surfaces of an enclosure bearing on the support structure and on the load plate respectively, to an enlarged scale, and FIGURE 4 is a perspective view, on a smaller scale, of the weighing device of the invention as applied to a flour silo, parts being shown as broken away.

Referring now to the drawings and more particularly to FIGURES 1 and 2, two enclosures $2a$ and $2b$, filled with a fluid 3, rest on a support structure 1, the interiors of the enclosures communicating through a tube 4. A device 5 for measuring the pressure of this fluid is connected to the said tube, and a plate 6, on which a weight or load P is placed, rests on the enclosures.

The enclosures $2a$ and $2b$ have walls consisting of a fluid-tight material which is pliable but virtually inextensible for the maximum weighing capacity of the device; the said enclosures may be constituted by two tubes of waterproof cloth with hermetically sealed ends. They contain an incompressible fluid such as water, to which e.g. glycol is added so as to lower the freezing-point; the said liquid is inserted in such a manner that the tubes contain no air, and they are filled to about 50% of their total capacity.

In FIGURES 1 and 2, the surfaces of the plate 6 and the support structure 1 which are in contact with the enclosures $2a$ and $2b$ (which would have a cylindrical section if 100% full) have been shown flat.

The loaded plate 6 has a weight P which exerts two forces respectively on the surfaces bearing on the enclosures $2a$ and $2b$ if the centre of gravity of the loaded plate 6 is in the transverse median plane (FIGURE 1), the two forces F1 and F2 are each equal to $P/2$ and the bearing surfaces $s1$ of the plate bearing on the enclosure $2a$ and $s2$ bearing on the enclosure $2b$ are equal, and such that if $p$ is the pressure of the fluid in these intercommunicating enclosures, we have:

$$ps1 = \frac{P}{2} \text{ and } ps2 = \frac{P}{2} \text{ or } p(s1+s2) = P$$

Since the liquid is incompressible, if the weight P varies, not in location on plate 6, but in value the surfaces $s1$ and $s2$ remain unchanged and only the pressure $p$, which is proportional to P, varies: the measurement of the pressure $p$ gives the value of P and the piezometer may be graduated in units of weight, taking into account the tare weight constituted by the plate.

Now if, for a given value of the weight P, the point at which it is applied to the plate is moved in relation to the transverse median plane of the said plate, as shown in FIG. 2, the forces F1 and F2 applied to the bearing surfaces are no longer each equal to $P/2$: the force applied to the bearing surface towards which the weight P has been moved increases and becomes F'2, while the other force becomes F'1, the sum $F'1+F'2$ remaining equal to P.

The effect of increasing the value of the force F'2 is to tend to increase the value of the pressure of the fluid contained in the corresponding enclosure $2a$, while the effect of the reduction of the value of the force F'1 is to tend to decrease the value of the pressure of the fluid contained in the other enclosure $2b$.

But as the enclosures intercommunicate through the conduit 4, a certain quantity of fluid will pass from the overloaded enclosure $2a$ into the unloaded enclosure $2b$ to maintain their pressures equal.

As a result, due to the shapes of the bearing surfaces, there will be an increase in the value of the surface $s2$, which becomes $s'2$, and a reduction in the value of the surface $s1$, which becomes $s'1$; the pressure $p$ remaining constant, we have:

$$p = \frac{F'1}{s'1}$$

and $$p = \frac{F'2}{s'2}$$

with $p(s'1+s'2) = F'1+F'2 = P$ from which it can be deduced that the sum of the values of the surfaces $s'1$ and $s'2$ remains constant and equal to $s1+s2$.

This is why the parts adjacent to the bearing surfaces necessarily have different curvatures. In other words, when the weight P is displaced relative to the plate 6, it is necessary for the accurate operating of the device, that this plate 6 may roll on the enclosures $2a$ and $2b$ so that the values $s1$ and $s2$ of the surfaces of these enclosures in contact with the plate 6 may freely change of value to $s'1$ and $s'2$, being recalled that the sum $s'1+s'2$ remains equal to $s1+s2$.

For example, it is possible to design a flat plate surface bearing on an enclosure which, when 100% full, would have a circular section—or a cylindrical plate surface bearing on the same enclosure—or, indeed, any similar appropriate combination.

It is as well to note that such a movement of the center of gravity is limited; for example, if this movement were such that the load P were perpendicular to one of the bearing surfaces, this would then carry the entire load and the other surface would carry no load. Theoretically, on the completely unloaded surface side, there would then be a 100% full enclosure, and a tangent between the enclosure and the bearing surface of the plate; the measurement of the load carried would then be false.

In industrial weighing in practice, however, this extreme case cannot occur, since the extent to which the loads are off centre is generally fairly small.

It is easy to see that it is also possible to influence the extent to which the centre of gravity moves for a movement of the load supported by the plate by using a relatively heavy plate in relation to the weight of the load.

In particular, where lorries are to be weighed on a scale using the device according to the invention, it is advantageous to use a relatively very heavy plate, so that the device can cope with an asymmetrical exertion of the weight of the lorry with respect to the weighing plate, with no error in the measurement.

It is also as well to note the influence that the shapes and the value of the bearing surfaces and also of that of the extent to which the enclosures are filled have on the maximum capacity of the weighing device. In particular, this maximum capacity is reached when one of the bearing surfaces of the plate comes to the lower or upper stop, the lower stop corresponds to an absence of fluid between the walls of the enclosure located between the support structure and the bearing surface of the plate; the upper stop corresponds to a 100% full enclosure, the section at right angles of the said enclosure showing a tangent between the enclosure and the bearing surfaces.

Regarding the shapes, it is evident that the effect of a plate bearing surface with too sharp a curvature will be that it will reach the lower stop defined above too soon.

Regarding the value of the bearing surfaces, it is no less evident that since the value of the surface $s1$ of an enclosure increases with downward movement of the centre of gravity of the loaded plate, the maximum capacity of the weighing device will be reached when the value of the bearing surface $s1$ can no longer increase, e.g. if the bearing surface of the plate is insufficiently wide; as an example, considering a flat plate surface bearing on an enclosure which, when 100% full, would have a cylindrical section of radius R, the section being made at right angles, the maximum capacity of the device will be obtained with a plate bearing surface at least $\pi R$ wide.

Lastly, regarding the influence of the extent to which the enclosures are filled on the maximum capacity of the weighing device, the said influence will clearly be seen from the foregoing remarks on the positions of the lower and upper stops: where the enclosures are not full enough, the result is arrival at the lower stop for a value of the movement of the center of gravity of the load which may be less than the value which could be provided for in practice—and where the enclosures are over-filled, the result is arrival at the upper stop for the value of such a movement of the said center of gravity.

In practice, it is generally most appropriate to fill the enclosures slightly more than 50% full.

Advantageous shapes of the plate and support structure surfaces bearing on the enclosure are shown in FIGURE 3. A support member $1a$ of slightly convex configuration is inserted between the support structure 1 and the enclosure $2a$. A support member $6a$ of the same shape is likewise inserted between the said enclosure and the plate 6.

An application of the weighing device to a silo, a flour silo, for example, is shown in FIGURE 4. Two steel I-girders $11a$ and $11b$ rest no a support structure 10. On these girders rest two enclosures $12a$ and $12b$ which are partly filled with an incompressible fluid 13.

A tube 14 interconnects the enclosures $12a$ and $12b$ and a piezometer 15 is connected to the said tube.

A silo 16 rests on the enclosures $12a$ and $12b$ via blocks $16a$ and $16b$ fixed to the silo. The latter comprises a loading pipe 17 and an unloading hopper 18 provided with a pipe 19.

The mass of flour has been shown as an off center pyramid 20. This mass of flour which accumulates as a result of the fact that it is loaded from above by the pipe 17 is not usually perfectly central, but it has been seen from the foregoing description that the relatively small extent to which it is off-center has no influence on the reading of the weight made by means of the piezometer.

I claim:

1. A piezometric weighing device, support structure comprising a plate for supporting a load, at least one flexible enclosure positioned between the plate and a support structure, the said enclosure containing a volume of incompressible liquid which volume is less than the maximum capacity of the enclosure, said enclosure being bounded by walls made of a fluid-tight, pliable and inextensible material, and a device connected to the enclosure for measuring the pressure of the liquid therein, said enclosure resting freely on the support structure exclusively at the lower part and the plate resting on the wall of the enclosure at at least two spaced bearing surfaces, the center of gravity of the plate and the load being located between said bearing surfaces, the parts of the plate and of the enclosure adjacent to those bearing surfaces which are in contact being of such configuration as to permit relative rolling between said plate and said enclosure whereby the measurement is substantially accurate, even if the load is off center.

2. A device as claimed in claim 1, wherein at least two enclosures are provided and there is at least one tube made of a fluid-tight and inextensible material interconnecting them.

3. A device as claimed in claim 2, wherein the enclosures are in the form of cylindrical tubes hermetically sealed at their ends.

References Cited by the Examiner

UNITED STATES PATENTS

| 1,458,920 | 6/23 | Troll | 177—208 |
| 2,051,042 | 8/36 | Hendel et al. | 177—209 |
| 2,269,969 | 1/42 | Branick | 177—208 |

FOREIGN PATENTS

| 230,030 | 4/25 | Great Britain. |
| 239,406 | 9/25 | Great Britain. |

LEO SMILOW, *Primary Examiner.*